W. L. SHEPARD.
CLUTCH.
APPLICATION FILED MAY 17, 1916.
1,229,664.
Patented June 12, 1917.
2 SHEETS—SHEET 1.
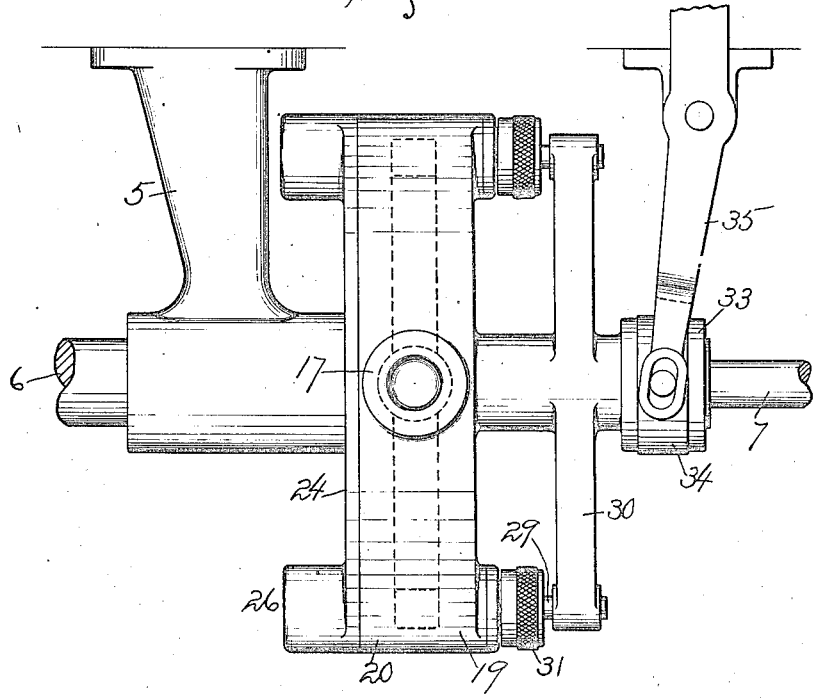
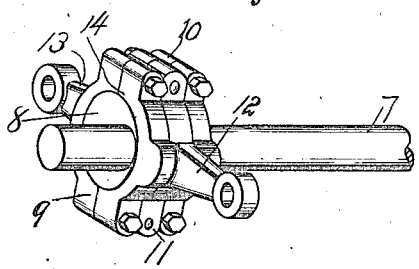
WITNESSES:
Louis Lucia.
M. B. Jenkins.
INVENTOR.
Wilbur L. Shepard.
BY Arthur B. Jenkins.
ATTORNEY.

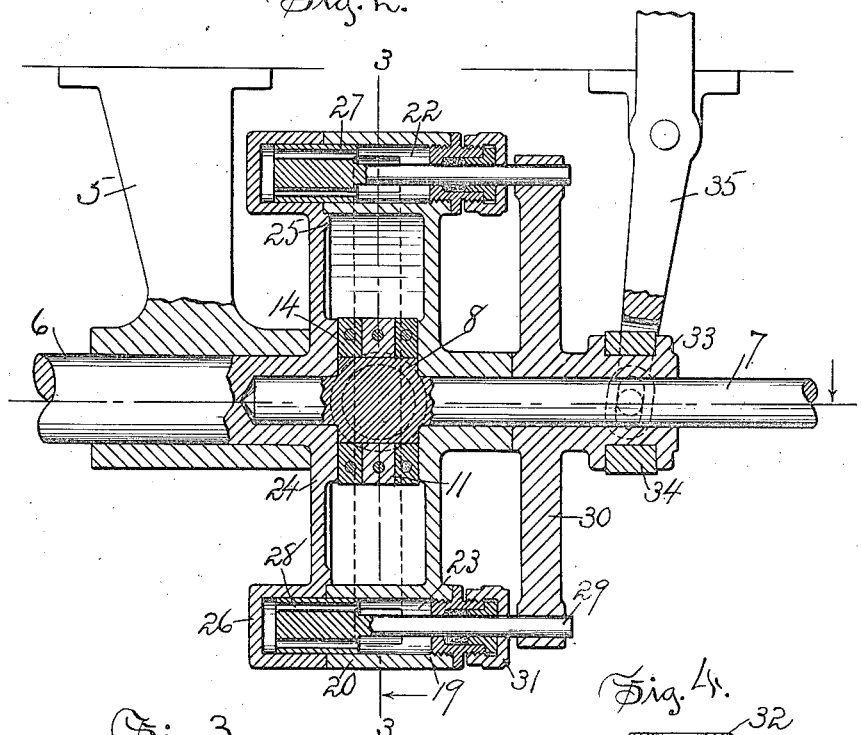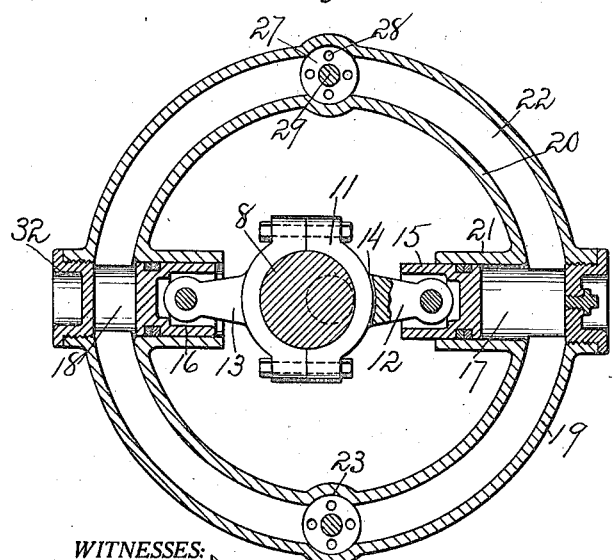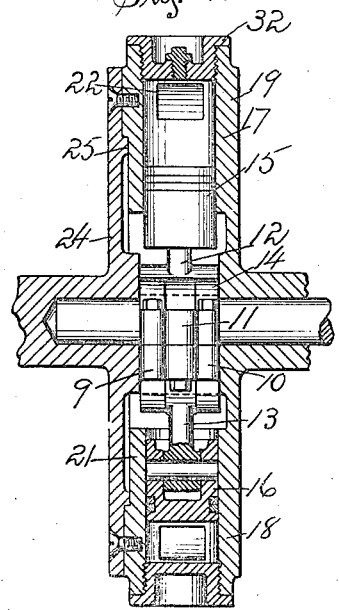

UNITED STATES PATENT OFFICE.

WILBUR L. SHEPARD, OF ELMWOOD, CONNECTICUT.

CLUTCH.

1,229,664.

Specification of Letters Patent.     Patented June 12, 1917.

Application filed May 17, 1916. Serial No. 98,225.

*To all whom it may concern:*

Be it known that I, WILBUR L. SHEPARD, a citizen of the United States, and a resident of Elmwood, in the county of Hartford and State of Connecticut, have invented a new and Improved Clutch, of which the following is a specification.

My invention relates to the class of devices in the use of which a driving and a driven member are coupled together for simultaneous movement, and an object of my invention, among others, is to provide a device of this class that shall be extremely durable, of simple and inexpensive construction and having means to gradually apply the driving power to the driven member; and a further object of my invention is to provide a device of this kind that shall be particularly efficient in its method of operation.

One form of clutch embodying my invention, and in the construction and use of which, the objects herein set out, as well as others, may be attained, is illustrated in the accompanying drawings, in which:

Figure 1 is a view in side elevation of a clutch embodying my invention.

Fig. 2 is a view in central longitudinal section through my improved clutch on a plane passing through the center of the valve chambers, the parts being further broken away to show construction.

Fig. 3 is a view in cross section on plane denoted by dotted line 3—3 of Fig. 2, the middle piston rod and its strap, however, being shown in full.

Fig. 4 is a view in central longitudinal section through my improved clutch on a plane passing through the center of the cylinders.

Fig. 5 is a detail perspective view illustrating the piston rods and straps securing them to the eccentric.

In the accompanying drawings the numeral 5 indicates a support for a shaft 6, as herewith shown, this support projecting downwardly from the part to which it is secured. The shaft 6 is recessed axially to receive the end of a shaft 7, which shaft will be supported in any suitable manner at a proper distance from the shaft 6.

An eccentric 8 is secured to the shaft 7, preferably being formed integral therewith and straps 9, 10 and 11 applied to the eccentric, are secured to piston rods 12 and 13. The piston rod 12 is forked and the straps 9 and 10 are applied to these forks, while the piston rod 13 rests between the straps 9 and 10 secured to the forks 14 of the piston rod 12 and receives the strap 11, it being understood that the ends of the piston rods 12 and 13 are formed to partially surround the shaft.

In the preferred form of construction, and as shown herein, the clutch body is formed in two parts, a body section 19 and a cap 24, cylinders 17 and 18 being formed in this clutch body and preferably in the section 19 thereof. The clutch body is preferably round and comprises a flange 20 forming the bounding wall of a chamber at the center of the body and having radial projections 21 extending into said chamber from diametrically opposite sides thereof and in which projections the cylinders 17 and 18 are located. A shifter channel 22, formed in the flange 20, extends completely around and across the chambers in the cylinders, and also across valve chambers 23 formed in said flange on diametrically opposite sides of the body and preferably midway between the cylinders 17 and 18.

The cap 24 has a flange 25 to fit within the flange 20. The cap 24 has two projections 26 oppositely arranged and within which a portion of the valve chambers 23 are formed.

Valves 27 are located for reciprocating movement in the chambers 23, these valves preferably having ports 28 extending through them from end to end and with valve operating rods 29 projecting out of the chambers and secured at their outer ends to a cross bar 30 by means of which the valves are operated. Closures 31 of any suitable construction are applied to the ends of the valve chambers, a stuffing box construction being shown herein as one means for closing these chambers. The outer ends of the cylinders 17, 18, may be closed as by means of screw caps 32.

The cross bar 30 is slidably mounted on the shaft 7 and bears a grooved collar 33 containing a ring 34 pivotally attached to an operating lever 35 in a manner common to devices of this class, and by means of which lever the cross bar may be operated to shift the valves 27 for a purpose to be now described.

It will be noted that the clutch herein described is extremely simple in its construction, the parts being so formed and attached one to the other as to provide a device that is extremely compact and of sufficient strength to effectually resist all of the power to which it may be subjected.

In operation, the shifter channel 22 being supplied with a fluid, as oil, to the required amount, and the valves 27 being in position to open the channel 22, as shown in Fig. 2 of the drawings, as the shaft 7 is driven, the eccentric connection will cause the pistons 15 and 16 to be reciprocated in their respective cylinders, the fluid in this operation shifting alternately one way and then the other as one piston is forced into its cylinder and the other is drawn outwardly. When the valves 27 are moved in a direction to close the shifter channel, an obstruction is interposed to the free shifting of the liquid, the more the valves are closed the greater such obstruction, until a point will be reached at which the obstruction will be so great as to cause the cap section 24 and the clutch body to be rotated, this point depending upon the amount of load carried by said clutch body. After this point is reached, the valves being moved farther in the closing direction, the movement of the shaft 7 and the eccentric, which, when the valves are open, rotate freely within the clutch body, will be imparted more and more to said body until such time that the valves 27 completely close the shifter channels, when the connection between the shaft 7 and the clutch body will be complete, and there will be interposed between said members a solid connection so that the clutch body will be thus positively driven.

The clutch body is rigidly connected with the shaft 6 and it will be seen that in the operation of this clutch the speed of said body and of the shaft 6 may be regulated by the position of the valves 27, and that this speed may be gradually increased or decreased. The clutch embodies the advantage of a friction clutch as to that feature obviating a sudden positive connection, and it also embodies the advantage of a positive drive between the clutch members if such be desired. It is observed that while the shaft 7 has been designated the driving member herein, that the device will operate to fulfil its purpose if the initial power be applied to the shaft 6.

In accordance with the provisions of the patent statutes, I have described the principle of operation of my invention, together with the apparatus which I now consider to represent the best embodiment thereof; but I desire to have it understood that the apparatus shown is only illustrative, and that the invention may be carried out by other means.

I claim:

A clutch including a body, cylinders oppositely arranged on said body and having fluid passages extending between them, pistons located in said cylinders, a shaft extending into the body, a member secured to the shaft within said body, piston rods connecting said member and said pistons, a cap secured to the body and having portions of valve chambers therein, the other portions of said valve chambers being formed in said body, and valves located in said chambers to control the flow of fluid through said passages that open into said valve chambers.

WILBUR L. SHEPARD.